United States Patent Office 2,846,665
Patented Aug. 5, 1958

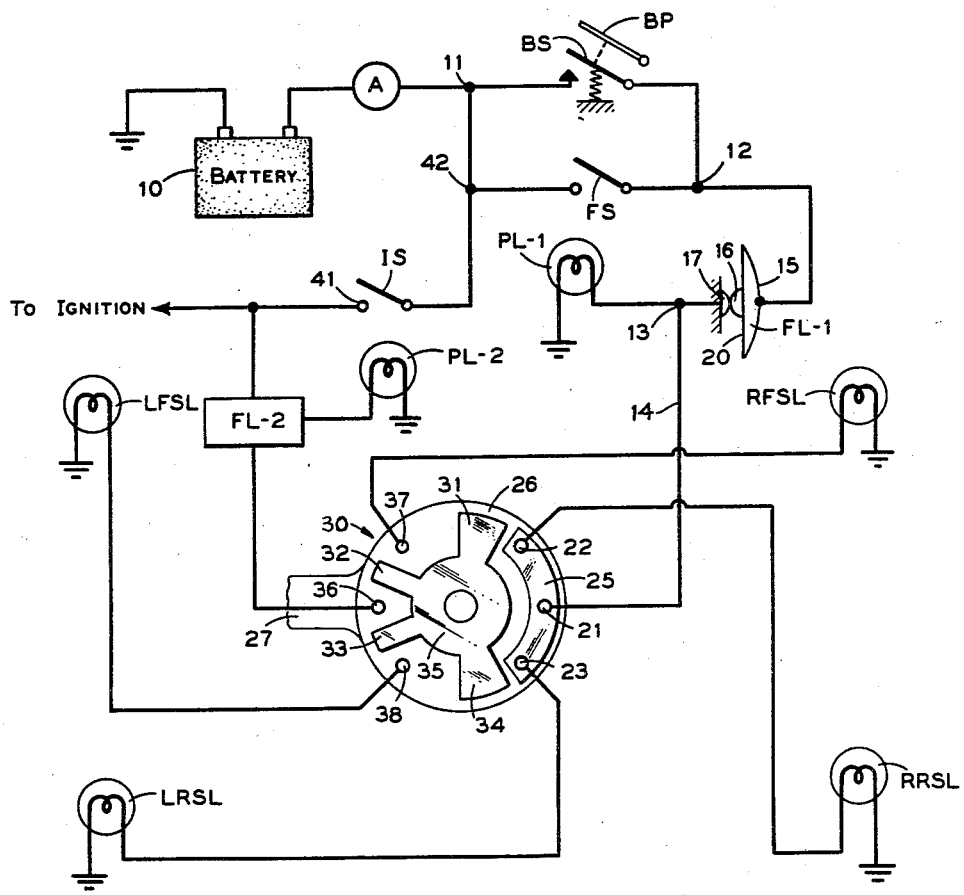

2,846,665

SIGNALING SYSTEMS FOR AUTOMOTIVE VEHICLES

Jesse R. Hollins, Brooklyn, N. Y., assignor, by mesne assignments, to Abraham Hollins and Jesse R. Hollins, Brooklyn, Lewis S. Hollins, Great Neck, and Theodore D. Davidson, New York, N. Y.

Application December 30, 1955, Serial No. 556,580

6 Claims. (Cl. 340—81)

This invention relates to signaling systems for automotive vehicles and, more particularly, to a novel signaling system for conjoiningly flashing both stop lamps for a normal brake application, selectively flashing one stop lamp for an unbraked turn, and selectively flashing one stop lamp and steadily energizing the other for a turn with the brakes applied.

It is a known fact that a flashing signal lamp provides a much more effective warning signal than a steady burning lamp, and this fact has been taken advantage of in present turn signal arrangements for automotive vehicles. It would also be advantageous to have the stop lamps flashed for a brake application rather than have them burn steadily. However, the presence of flashing lamps on both sides of the rear of the vehicle, when a turn is signaled with the brakes applied, would seriously detract from the effectiveness of the turn signal. This is even more true when the same lamps are used both as stop lamps and as turn signal lamps. Consequently, present signaling systems involve steady burning lamps for brake applications and selectively flashed lamps for turn signals.

Another desirable feature for an automotive signal system is a simple and effective arrangement for providing a flashing "flare" signal for emergency parking, as for repairs or tire changes, preferably utilizing existing lamp equipment.

In accordance with the present invention, novel signaling arrangement is provided wherein the stop lamps are used as turn signal lamps and are normally flashed conjointly during a brake operation, and are selectively flashed for an unbraked turn, while for a braked turn one lamp is flashed and the other steadily energised. In addition, both stop lamps may be selectively conjointly flashed by a special "flare" switch to act as "flare" signals, by a switch in shunt relationship with the brake switch.

To effect the foregoing, a closed circuit flasher and a turn signal selector switch are connected between the brake-operated switch and the stop lamps. This flasher is a normally closed circuit flasher of the high resistance wire actuated type which operates as a circuit interrupter only when both stop lamps are drawing current. When only one stop lamp draws current, the flasher remains closed and does not act as a cycling circuit interrupter.

One make of flasher of this type is that known to the art as a "ZN" type flasher manufactured by the Signal-Stat Corporation of Brooklyn, New York. A "AN" flasher comprises a snap action metal vane normally held in a stressed condition by a high resistance ribbon or wire secured at both ends to diagonally opposite corners of the vane and carrying a contact at its center engaged with a fixed contact. When the flasher circuit is closed, if there is sufficient flow of current, the ribbon or wire heats and expands to allow the vane to snap to an unstressed poistion moving the movable contact away from the fixed contact to open the flasher circuit. As the wire or ribbon cools, the vane is snapped back to the stressed position, re-engaging the contacts and closing the flasher circuit. This type of flasher opens and closes from 80 to 120 times per minute. In some models, the movable vane is carried by a free corner of the vane.

A second flasher, of any desired type and a direction signal selector switch is connected between the battery and the stop lights and the feed line therefor, usually through the ignition switch. In the neutral position of the turn selector switch, both stop lamps are connected to the normally closed flasher, and thus are flashed when the brakes are applied. When the selector switch is moved to signal a turn, one stop lamp remains connected to the normally closed flasher, and the other stop lamp is connected to the turn signal flasher.

Thus, one stop lamp is flashed to signal a turn and, if the brakes are not applied, the other stop lamp is not energized. Should the brakes be applied while a turn is being signaled, the other stop lamp will be steadily energized as the current through the normally closed flasher is insufficient to operate the latter to open its normally closed contacts.

For "flare" signal purposes, a normally open "flare" switch is connected between the battery and the normally closed flasher in shunt with the brake operated switch.

A pilot lamp is operated by the normally closed flasher and acts as an indicator of the condition of this flasher and of the stop lamps. Should either stop lamp be inoperative, the current drain, when the brake switch is closed, will be insufficient to open the flasher contacts. The resultant steady burning of the pilot lamp, when the brakes are applied, will indicate inoperativeness of one stop lamp. Should both stop lamps be inoperative, the pilot lamp will also burn steadily, when the brakes are applied, as the stop lamp circuit will be open at the stop lamps. The turn signal flasher operates a second pilot lamp in the usual manner.

For an understanding of the invention principles, reference is made to the following description of typical embodiments thereof as illustrated in the accompanying drawings. In the drawings, the single figure is a schematic wiring diagram of an automotive signaling circuit arrangement embodying the invention.

Referring to Fig. 1, the usual grounded vehicle battery 10 is connected through an ammeter A to a junction point 11. Point 11 is connected through normally open brake switch BS, closed whenever brake pedal BP is operated, to one terminal 12 of a normally closed flasher FL-1. Flasher FL-1 comprises a snap action vane 15 connected to terminal 12 and held in a stressed condition by a high resistance wire or ribbon 20. The latter carries a contact 16 normally engaged with a fixed contact 17 connected to terminal 13 of flasher FL-1. A grounded pilot lamp PL-1 is connected to terminal 13.

Flasher terminal 13 is connected by a conductor 14 to a contact 21 engaged by a contact closure plate 25 carried by a dielectric disk 26 forming part of a signal selector switch 30 operated by a lever 27. In the illustrated neutral or off position of switch 30, plate 25 is engaged with contacts 22 and 23, on either side of contact 21, and respectively connected to grounded left stop lamp LRSL and grounded right stop lamp RRSL.

Disk 26 carries a second circuit closure plate 35 having angularly spaced relatively narrow fingers 31, 32, 33, 34. Fingers 31 and 34 are selectively engageable with contacts 22 and 23. Fingers 32 and 33 selectively connect a central contact 36 to either of a pair of contacts 37, 38 on either side thereof, when switch 30 is operated to signal a turn.

Contact 36 is connected through a second, or turn signal flasher, FL-2 to normally open contact 41 of ignition switch IS having its movable arm connected, through junction point 42, to junction point 11. A second grounded pilot lamp PL–2 is connected to flasher FL–2. Contacts 37, 38 are respectively connected to right front signal lamp RFSL and left front signal lamp LFSL. For a purpose to be described, a normally open, manually operable "flare" switch FS is connected between point 42 and flasher terminal 12 in shunt with brake operated switch BS.

The arrangement of Fig. 1 operates as follows. With selector switch 30 in the neutral position, if brake pedal BP is operated to apply the brakes, switch BS is closed and current flows through flasher FL–1, closed contacts 16, 17, contact 21, plate 25, and contacts 22, 23 to the stop lamps. The current flow through the stop lamps in parallel is sufficient to operate flasher FL–1 and the stop lamps and pilot lamp PL–1 are flashed in synchronism.

Assume that, with the brakes off, switch 30 is operated to signal a left turn. Counterclockwise movement of disk 26 causes plate 25 to disengage contact 23, finger 34 of plate 35 to engage this contact, and fingers 32 and 33 to engage contacts 36 and 38, respectively. If ignition switch IS is closed, flasher FL–2 flashes lamp LFSL through contact 36, finger 32, finger 33, contact 38; and flashes a stop lamp LRSL through contact 36, finger 32, finger 34, and contact 23. The left signal and stop lamps are thus flashed, as is also pilot lamp PL–2. The two right side lamps remain unlit.

If the brakes are applied while such a left turn is being signaled, current will flow through flasher FL–1 through contacts 16—17—21, plate 25 and contacts 22 to right stop lamp RRSL, but this lamp will not be flashed but will burn "steady on" as the current flow, with only one stop lamp in circuit, is insufficient to heat ribbon or wire 20 enough to expand it the amount necessary to snap vane 15 to the circuit breaking position. Thus, lamp RRSL is "steady on" and there is no conflict with the flashing turn signal of lamp LRSL and since lamp RRSL is burning "steady on" pilot lamp PL–1 also burns "steady on." A corresponding operation of the respective lamps and the pilot lamp occurs when the brakes are applied with a right turn being signaled.

When an emergency stop is made, as for repairs or tire changes, it is desirable to flash the stop lamps as a "flare" signal to warn following drivers. This can be effected, of course, by holding the brake pedal depressed, but this is impractical for obvious reasons. Consequently, the circuit arrangement of the invention provides means independent of the brake switch for flashing the stop lamp through flasher FL–1. As illustrated, this means comprises hand operated "flare" switch FS which is in shunt with brake switch BS and flashes both stop lamps when it is manually closed; in this instance pilot lamp PL–1 will flash to indicate that the stop lamps RRSL and LRSL are flashing as flares.

Pilot lamp PL–1 acts as an indicator of the conditions of the stop lamps and of flasher FL–1. Should the flasher fail in the open position, pilot lamp PL–1 will not be lit when brake switch BS or flare switch FS is closed and, should the flasher fail to open, the pilot lamp will burn steadily. Should the brakes be applied with selector switch 30 in the neutral position and one stop lamp be inoperative, flasher FL–1 will not open due to the insufficient current flow and pilot lamp PL–1 will burn steadily. Under the same conditions, if both stop lamps are inoperative, pilot lamp PL–1 will also burn steadily, as the stop lamp circuit, beyond terminal 13 and through switch 30, will be open. Thus, pilot lamp PL–1, by its steady burning under these conditions, acts as a "tell-tale" of the inoperative condition of one or both stop lamps.

While specific embodiments of the invention have been shown and described in detail to illustrate the application of the invention principles, it will be understood that the invention may be embodied otherwise without departing from such principles.

What is claimed is:

1. In combination with an automotive vehicle having a battery, a normally open brake pedal operated brake switch in series with said battery, and a pair of stop lamps mounted on either side of the rear of the vehicle; a first flasher including a thermostatic operator and a pair of normally closed contacts in series with said brake switch; a turn signal selector switch interposed between said contacts and said stop lamps, and having a neutral position and a pair of turn signaling positions; and a second flasher in series with said battery and said selector switch; said selector switch, in its neutral position, connecting both stop lamps in parallel to said normally closed contacts and, in either turn signaling position, connecting one stop lamp to said normally closed contacts and the other stop lamp to said second flasher; said thermostatic operator, when both stop lamps in parallel are drawing current therethrough, being sufficiently heated to periodically open and close said contacts and, when only one stop lamp is drawing current therethrough, being insufficiently heated to open said contacts; whereby to flash both stop lamps if the brakes are applied with the selector switch in the neutral position, and to flash said one stop lamp to signal a turn if the selector switch is moved to a turn signaling position without application of the brakes; said other stop lamp, if the brakes are applied while said selector switch is in a turn signaling position, being steadily energized through said contacts in the closed position.

2. In combination with an automotive vehicle having a battery, a normally open brake pedal operated brake switch in series with said battery, a pair of stop lamps mounted on either side of the rear of the vehicle, and a normally open ignition switch in series with said battery; a first flasher including a thermostatic operator and a pair of normally closed contacts in series with said brake switch; a turn signal selector switch interposed between said contacts and said stop lamps, and having a neutral position and a pair of turn signaling positions; and a second flasher in series with said ignition switch and said selector switch; said selector switch, in its neutral position, connecting both stop lamps in parallel to said normally closed contacts and, in either turn signaling position, connecting one stop lamp to said normally closed contacts and the other stop lamp to said second flasher; said thermostatic operator, when both stop lamps in parallel are drawing current therethrough, being sufficiently heated to periodically open and close said contacts and, when only one stop lamp is drawing current therethrough, being insufficiently heated to open said contacts; whereby to flash both stop lamps if the brakes are applied with the selector switch in the neutral position, and to flash said one signal lamp to signal a turn if the selector switch is moved to a turn signaling position without application of the brakes; said other stop lamp, if the brakes are applied while said selector switch is in a turn signaling position, being steadily energized through said contacts in the closed position.

3. In the combination claimed in claim 1, a normally open manually operable flare switch connected in series between said battery and said operator in shunt with said brake switch to flash said stop lamps independently of said brake switch.

4. In the combination claimed in claim 1, a grounded pilot lamp connected in series with said contacts, whereby said pilot lamp will burn steadily when the brake switch is closed with the selector switch in the neutral position and either or both stop lamps are inoperative.

5. In combination with an automotive vehicle having a battery, a normally open brake pedal operated brake switch in series with said battery, and a pair of stop lamps mounted on either side of the rear of the vehicle; a first flasher including a thermostatic operator and a pair of normally closed contacts in series with said brake switch; a turn signal selector switch interposed between said contacts and said stop lamps, and having a neutral position and a pair of turn signaling positions; and a second flasher in shunt with said first flasher between said battery and said selector switch; said selector switch, in its neutral position, connecting both stop lamps in parallel to said normally closed contacts and, in either turn signaling position, connecting one stop lamp to said normally closed contacts and the other stop lamp to said second flasher; said thermostatic operator, when both stop lamps in parallel are drawing current therethrough, being sufficiently heated to periodically open and close said contacts and, when only one stop lamp is drawing current therethrough, being insufficiently heated to open said contacts; whereby to flash both stop lamps if the brakes are applied with the selector switch in the neutral position and to flash said one stop lamp to signal a turn if the selector switch is moved to a turn signaling position without application of the brakes; said other stop lamp, if the brakes are applied while said selector switch is in a turn signaling position, being steadily energized through said contacts in the closed position.

6. In the combination claimed in claim 1, a pair of turn signal lamps on either side of the front of the vehicle selectively connected to said second flasher in either turn signal position of said selector switch.

References Cited in the file of this patent

UNITED STATES PATENTS

| | | |
|---|---|---|
| 2,225,732 | Bedford | Dec. 24, 1940 |
| 2,602,849 | Lawson et al. | July 8, 1952 |
| 2,706,809 | Hollins | Apr. 15, 1955 |